United States Patent
Komura

(10) Patent No.: US 8,836,685 B2
(45) Date of Patent: Sep. 16, 2014

(54) LIQUID CRYSTAL DISPLAY DEVICE

(75) Inventor: Shinichi Komura, Mobara (JP)

(73) Assignees: Japan Display Inc., Tokyo (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 829 days.

(21) Appl. No.: 13/005,621

(22) Filed: Jan. 13, 2011

(65) Prior Publication Data

US 2011/0187695 A1   Aug. 4, 2011

(30) Foreign Application Priority Data

Jan. 29, 2010   (JP) ................... 2010-018453

(51) Int. Cl.
*G09G 5/00* (2006.01)
*G09G 3/36* (2006.01)
*G06F 3/038* (2013.01)

(52) U.S. Cl.
CPC .. *G06F 3/038* (2013.01); *G09G 3/36* (2013.01)
USPC ........... 345/211; 345/206; 345/209; 345/210; 345/213; 345/214

(58) Field of Classification Search
CPC .................................. G09G 3/36; G06F 3/038
USPC ........... 345/87–106, 204–214, 589, 690–692; 349/12, 19, 23, 25, 39, 54, 86, 102, 349/103, 117, 165, 179, 180
See application file for complete search history.

(56) References Cited

U.S. PATENT DOCUMENTS

| | | | |
|---|---|---|---|
| 5,798,744 A * | 8/1998 | Tanaka et al. ................. 345/92 |
| 5,831,707 A * | 11/1998 | Ota et al. ...................... 349/141 |
| 6,304,239 B1 * | 10/2001 | McKnight ....................... 345/87 |
| 2001/0040548 A1 * | 11/2001 | Ikeda ............................ 345/92 |
| 2002/0101433 A1 * | 8/2002 | McKnight ..................... 345/589 |
| 2003/0016201 A1 * | 1/2003 | Ayres et al. ..................... 345/98 |
| 2003/0081163 A1 | 5/2003 | Suzuki et al. |
| 2003/0133068 A1 | 7/2003 | Suzuki et al. |
| 2004/0125094 A1 * | 7/2004 | Hudson ......................... 345/204 |
| 2005/0264743 A1 | 12/2005 | Suzuki et al. |
| 2006/0050029 A1 * | 3/2006 | Toyoda et al. .................. 345/76 |
| 2006/0139289 A1 * | 6/2006 | Yoshida et al. ................. 345/98 |
| 2006/0145987 A1 * | 7/2006 | Hong ............................. 345/92 |

(Continued)

FOREIGN PATENT DOCUMENTS

| JP | 10-307295 | 11/1998 |
|---|---|---|
| JP | 10-319373 | 12/1998 |

(Continued)

*Primary Examiner* — Prabodh M Dharia

(74) *Attorney, Agent, or Firm* — Antonelli, Terry, Stout & Kraus, LLP.

(57) ABSTRACT

The liquid crystal display device includes: first and second substrates disposed facing each other via a liquid crystal layer, each substrate having a plurality of pixels arranged thereon in matrix form; a first electrode formed for each pixel on the first substrate side; a second electrode formed for each pixel on the first or second substrate side; and the liquid crystal layer being driven by a liquid crystal drive voltage applied between the first and second electrodes; wherein an inequation of VLmin≤VLmax<Vmax is satisfied, where VLmin is a liquid crystal drive voltage applied to the pixel to produce minimum brightness, VLmax is a liquid crystal drive voltage applied to the pixel to produce maximum brightness, and Vmax is a maximum liquid crystal drive voltage applied to the pixel.

11 Claims, 5 Drawing Sheets

(56) References Cited

U.S. PATENT DOCUMENTS

| | | | |
|---|---|---|---|
| 2006/0256244 A1* | 11/2006 | Jak et al. | 349/33 |
| 2007/0001952 A1* | 1/2007 | Lee | 345/88 |
| 2007/0040780 A1 | 2/2007 | Gass et al. | |
| 2008/0030514 A1* | 2/2008 | Ooishi et al. | 345/530 |
| 2008/0198117 A1* | 8/2008 | Kumakura | 345/89 |
| 2008/0259014 A1* | 10/2008 | Inoue | 345/89 |
| 2008/0300023 A1* | 12/2008 | Kim et al. | 455/566 |
| 2008/0309811 A1* | 12/2008 | Fujinawa et al. | 348/333.01 |
| 2011/0012924 A1 | 1/2011 | Gass et al. | |
| 2012/0056914 A1 | 3/2012 | Gass et al. | |
| 2012/0147026 A1 | 6/2012 | Gass et al. | |

FOREIGN PATENT DOCUMENTS

| | | |
|---|---|---|
| JP | 2003-255307 | 9/2003 |
| JP | 2006-098482 | 4/2006 |
| JP | 2007-017988 | 1/2007 |
| JP | 2008-275853 | 11/2008 |

* cited by examiner

LIQUID CRYSTAL DISPLAY DEVICE

CLAIM OF PRIORITY

The present application claims priority from Japanese Patent Application JP 2010-018453 filed on Jan. 29, 2010, the content of which is hereby incorporated by reference into this application.

BACKGROUND OF THE INVENTION

1. Field of the Invention

The present invention relates to a liquid crystal display device, and more particularly to a view-angle control technique for controlling a liquid crystal drive voltage applied to each pixel.

2. Description of the Related Art

With the dramatic recent improvement in performance for liquid crystal display devices, they are used for diverse application. For example, a liquid crystal display device has been developed that allows for screen display selection between a screen based on a typical wide view angle and a screen that can be checked only by the user. Such an operation for screen selection is performed especially when the user watches a television program or creates an E-mail message with a personal digital assistant (PDA) having various functions and when advertising is displayed or the user inputs his or her password screen on an automatic teller's machine (ATM).

Such a liquid crystal display device employs a technique that aggressively utilizes the view-angle dependency of a liquid crystal display panel. Specifically, the view-angle dependency of a liquid crystal display panel is based on the fact that the front brightness, i.e., the brightness of the liquid crystal display panel when viewed from the direction of the normal line (front direction) differs from the oblique brightness, i.e., the brightness of the liquid crystal display panel when viewed from a direction having a predetermined angle with respect to the normal line (oblique direction). A liquid crystal display device employing this technique is configured to superimpose an image recognizable only when viewed from an oblique direction of a display surface of the liquid crystal display panel onto an image recognizable when viewed from the direction of the normal line to the display surface, thereby enabling only the user at the front of the device to obtain a recognizable display image.

An exemplary liquid crystal display device using this display control technique is the liquid crystal display device described in JP-A-2008-275853. The technique discussed in JP-A-2008-275853 controls the gray-scale level of each pixel to attain a gray-scale level different for each frame in order to utilize the view-angle dependency of a liquid crystal display panel based on the vertical alignment (VA) type inclusive of the multiarea vertical alignment (MVA) type. Further, the control technique is designed to selectively control the gray-scale level for each pixel such that its average brightness coincides with the brightness of image display attained when viewed from the front direction and display an image.

SUMMARY OF THE INVENTION

An MVA type liquid crystal display panel uses gamma characteristics different between image display from the front direction (hereinafter referred to as front image display) and image display from an oblique direction (hereinafter referred to as oblique image display). Specifically, the liquid crystal display device panel of the MVA type performs front image display in a different way from oblique image display by utilizing the view-angle dependency of gamma characteristics. More specifically, when desired image display is to be performed, the technique discussed in JP-A-2008-275853 is based on gamma characteristic different between front image display and oblique image display such that the brightness of each pixel coincides with the average brightness for at least two continuous frames. For example, with a pixel producing front brightness of gray-scale level n, the technique selects a combination of such gray-scale levels (n1, n2) that their average front brightness coincides with the brightness of gray-scale level n and their average oblique brightness differs from the brightness of gray-scale level n. The technique further selects another combination of such gray-scale levels (n1', n2'). Then, the technique performs average brightness display with the combination of gray-scale levels (n1, n2) in an area A (bright area), and with the combination of gray-scale levels (n1', n2') in an area B (dark area). Performing display control in this way enables such image display that the average brightness by the combination of gray-scale levels (n1, n2) becomes higher than the average brightness by the combination of gray-scale levels (n1', n2') only when viewed from an oblique direction.

By contrast, as clearly discussed in JP-A-2008-275853, a liquid crystal display panel of the in-plane switching (IPS) type reveals little reduction in contrast ratio and little inverting phenomenon of the gray-scale characteristics when viewed from an oblique direction. In other words, the IPS type liquid crystal display panel has little difference between the gamma characteristic when viewed from the front direction (hereinafter referred to as front gamma characteristics) and the gamma characteristic when viewed from an oblique direction (hereinafter referred to as oblique gamma characteristics).

For this reason, there is a problem that the technique discussed in JP-A-2008-275853 cannot provide a sufficient difference between the average front brightness and the average oblique brightness, even if it is applied to the IPS type liquid crystal display panel.

The present invention has been devised in view of the above-mentioned problems, and it is an object of the present invention to provide a liquid crystal display device capable of performing view-angle control even when the liquid crystal display device has high view-angle characteristics.

To solve the above-mentioned problems, the present invention provides a liquid crystal display device comprising:

first and second substrates disposed facing each other via a liquid crystal layer, each substrate having a plurality of pixels arranged thereon in matrix form;

a first electrode formed for each pixel on the first substrate side;

a second electrode formed for each pixel on the first or second substrate side; and the liquid crystal layer being driven by a liquid crystal drive voltage applied between the first and second electrodes;

wherein an inequation of $VLmin \leq VLmax < Vmax$ is satisfied, where $VLmin$ is a liquid crystal drive voltage applied to the pixel to produce minimum brightness, $VLmax$ is a liquid crystal drive voltage applied to the pixel to produce maximum brightness, and $Vmax$ is a maximum liquid crystal drive voltage applied to the pixel.

According to the present invention, a liquid crystal display device of the VA type and a liquid crystal display device of the IPS type having high view-angle characteristics are capable of performing view-angle control.

Other effects of the present invention will be clearly described below by the present specification.

DETAILED DESCRIPTION OF THE PREFERRED EMBODIMENTS

Figure 1:
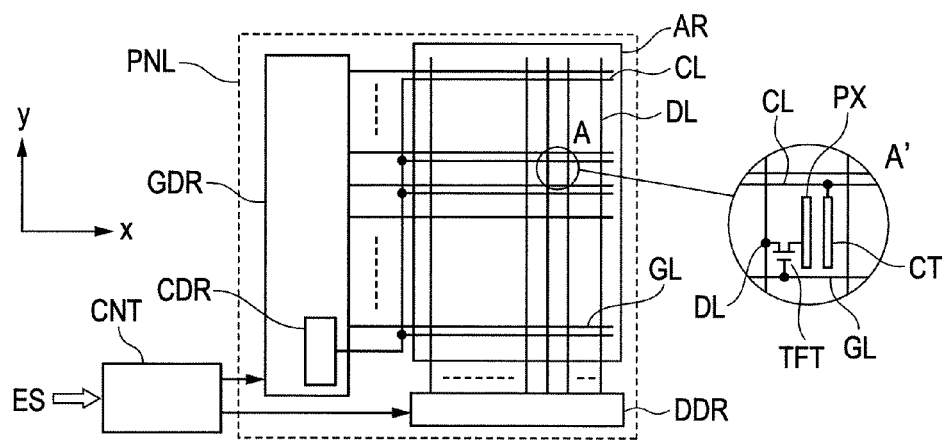
FIG. 1 illustrates an entire configuration of a liquid crystal display device according to a first embodiment of the present invention.

Embodiments of the present invention will be described below with reference to the accompanying drawings. However, in the following descriptions, identical elements are assigned the same reference numeral and therefore duplicated explanations are omitted.

First Embodiment

FIG. 1 illustrates an entire configuration of a liquid crystal display device according to a first embodiment of the present invention. The entire configuration of the liquid crystal display device according to the first embodiment will be described below with reference to FIG. 1.

The liquid crystal display device according to the first embodiment illustrated in FIG. 1 includes a liquid crystal display panel PNL. The liquid crystal display panel PNL includes: a first substrate (not illustrated) having pixel electrodes formed thereon; a second substrate (not illustrated) facing the first substrate, having a color filter and a black matrix (light shielding film) formed thereon, and a liquid crystal layer held by the first and second substrates. The liquid crystal display device is composed of such a liquid crystal display panel PNL and a backlight unit (not illustrated) serving as a light source. The first and second substrates are fixed and the liquid crystal are sealed by a seal member (not illustrated) annularly applied to a peripheral portion of the second substrate. In the following descriptions, the liquid crystal display panel PNL is also referred to as a liquid crystal display device.

The first and second substrates are not limited, for example, to a well-known glass substrate but may be other insulating substrates such as a silica glass or plastic (resin). For example, the use of a silica glass makes it possible to raise process temperature and accordingly increase the fineness of a gate insulation film of a thin-film transistor (TFT) (described below), thus improving the reliability. On the other hand, the use of plastic (resin) substrate enables providing a liquid crystal display device which is lightweight and shock-resistant.

Further, with the liquid crystal display device according to the first embodiment, areas in which a display pixel (hereinafter simply referred to as pixel) is formed, out of areas filled with liquid crystal, are included in a display area AR. Therefore, areas not having a pixel formed therein (areas irrelevant to display), out of areas filled with liquid crystal, are not included in the display area AR.

Referring to FIG. 1, with the liquid crystal display device according to the first embodiment, gate lines GL extending in the x-axis direction are arranged in the y-axis direction in the display area AR on the surface on the liquid crystal side of the first substrate. Further, drain lines DL extending in the y-axis direction are arranged in the x-axis direction.

A rectangular area formed by the drain lines DL and gate lines GL constitutes an area in which pixels are formed. Thus, pixels are arranged in matrix form in the display area AR. As illustrated in a magnified view A' of a portion of a circle A (FIG. 1), for example, each pixel has a TFT, a pixel electrode (first electrode) PX, and a common electrode (second electrode) CT. TFT turns ON by a scanning signal from the gate line GL. The pixel electrode (first electrode) PX is supplied with an image signal from the drain line DL via the turned-ON TFT. The common electrode (second electrode) CT is supplied with a common signal having a potential serving as a reference for a potential of the image signal connected to a common line CL. Although, as illustrated in the magnified view A', a common electrode CT is independently formed for each pixel and the common signal is input thereto via the common line CL, the configuration of the common electrode CT is not limited thereto. The common electrode CT may be formed so as to be directly connected to pixels continuously arranged in the x-axis direction, and the common signal is input from one end or opposite ends (of the first substrate) in the x-axis direction via the common line CL.

Each drain line DL extends across a seal member (not illustrated), for example, at its bottom end, and is connected to the corresponding one of output terminals of an image signal drive circuit (drain driver) DDR arranged at the bottom end of the liquid crystal display panel PNL. Likewise, each gate line GL extends across a seal member (not illustrated), for example, at its left end, and is connected to the corresponding one of output terminals of a scanning signal drive circuit (gate driver) GDR. In the first embodiment, the scanning line drive circuit GDR includes a common signal drive circuit (common driver) CDR for supplying the common signal to the common line CL which also extends across a seal member (not illustrated) at its left end, and is connected to the output terminal of the common signal drive circuit CDR.

Further, the liquid crystal display device according to the first embodiment includes a controller CNT for generating various control signals to be supplied to the scanning signal drive circuit GDR, the image signal drive circuit DDR, and the common signal drive circuit CDR based on an external signal ES. In particular, the liquid crystal display device according to the first embodiment is configured to select an output voltage of the image signal drive circuit DDR or an output voltage of the common signal drive circuit CDR in response to a view-angle control signal input as the external signal ES. For the output voltages of the image signal drive circuit DDR and the common signal drive circuit CDR in this case, the liquid crystal display device selectively outputs a conventional output voltage (hereinafter referred to as wide view-angle voltage) or an output voltage for performing view-angle control for liquid crystal display (hereinafter referred to as view-angle control voltage). However, in the first embodiment, the controller CNT has table data showing a relation between display data to be input as the external signal ES and output voltages (image signal and common signal) beforehand. In response to the view-angle control signal input as the external signal ES, the controller CNT suitably reference the table data and outputs a corresponding image signal and common signal, thus selecting the wide view-angle voltage or the view-angle control voltage.

Further, a flexible printed circuit board (not illustrated) is connected to the liquid crystal display device according to the first embodiment. For example, the controller CNT mounted on the flexible printed circuit board controls input of drive signals for the image signal drive circuit DDR, the scanning line drive circuit GDR, and the common signal drive circuit CDR. However, the circuit configuration is not limited thereto. The image signal drive circuit DDR, the scanning line drive circuit GDR, and the common signal drive circuit CDR may be mounted either on the flexible printed circuit board or the liquid crystal display panel PNL.

Figure 2:
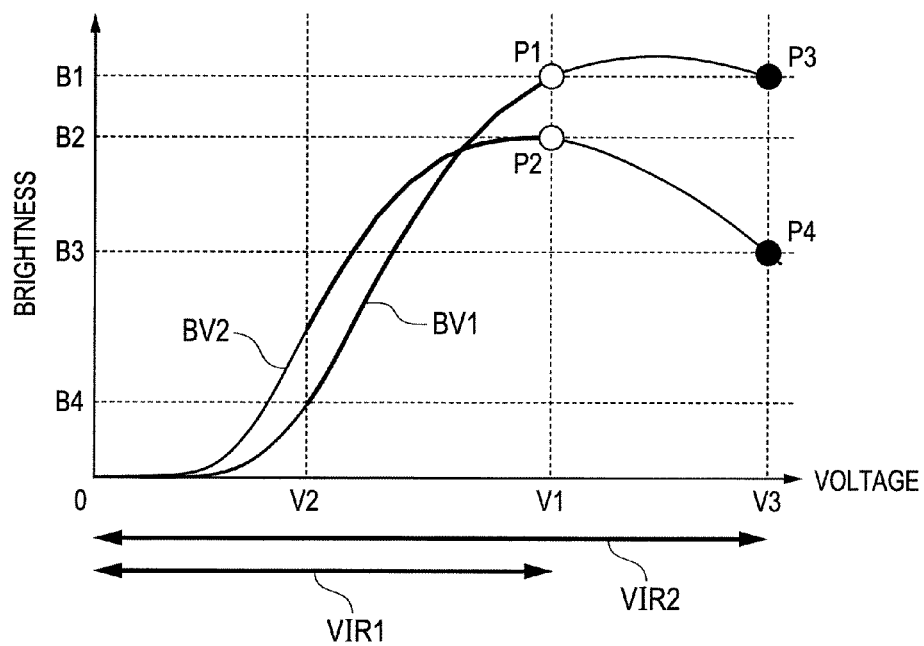
FIG. 2 is a graph illustrating a relation between an applied voltage for a pixel and brightness thereof with the liquid crystal display device according to the first embodiment of the present invention.
Figure 3:
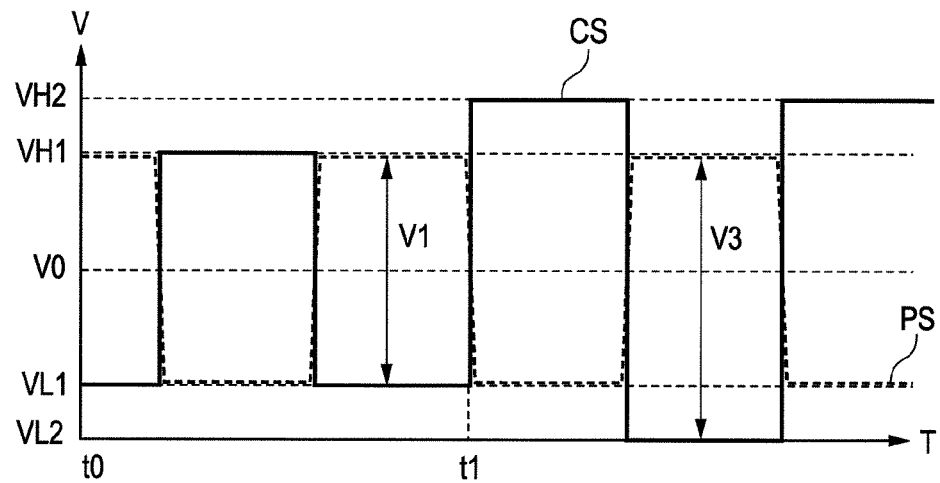
FIG. 3 is a graph illustrating a relation between an image signal and a common signal for a pixel producing the maximum brightness with the liquid crystal display device according to the first embodiment of the present invention.

FIG. 2 is a graph illustrating a relation between an applied voltage for a pixel and brightness thereof with the liquid crystal display device according to the first embodiment of the present invention. FIG. 3 is a graph illustrating a relation between an image signal and a common signal for a pixel producing the maximum brightness with the liquid crystal display device according to the first embodiment of the present invention. View-angle control operation by the liquid crystal display device according to the first embodiment will be described below with reference to FIGS. 2 and 3. Referring to FIG. 2, a brightness-voltage characteristic line BV1 represents brightness-voltage characteristics when the liquid crystal display device panel of the IPS type is observed from the front direction, and a brightness-voltage characteristic line BV2 represents brightness-voltage characteristics when the panel is observed from an oblique direction. Further, the brightness-voltage characteristic lines BV1 and BV2 magnifies a difference between the front brightness characteristics and the oblique brightness characteristics.

In the liquid crystal display device according to the first embodiment when the wide view-angle voltage is applied, i.e., in a regular drive mode in which view-angle control is not performed, a liquid crystal drive voltage corresponding to the display data is applied between the common electrode and each pixel electrode. A liquid crystal drive voltage applied to each pixel is shown by arrows, which is an applied voltage range (first applied voltage range) VIR1 from a voltage 0V (VLmin) to a voltage V1 (VLmax). Referring to FIG. 3, at a time t0 to a time t1, a common signal CS having a maximum voltage VH1, a minimum voltage VL1, and a predetermined center voltage V0 is applied to the common electrode. On the other hand, an image signal PS having the voltage V1 with reference to a common electrode CS is applied to the pixel electrode. Thus, as long as the wide view-angle operation is performed, the liquid crystal display device according to the first embodiment operates in a similar way to the conventional liquid crystal display device.

By contrast, when the view-angle control signal is input at the time t1, the common signal drive circuit CDR amplifies the amplitude of the common signal CS in response to an instruction from the controller CNT, and sets the maximum voltage to VH2 and the minimum voltage to VL2. In this case, the applied voltage for the pixel electrode of a pixel producing the maximum brightness remains unchanged. As a result, a liquid crystal drive voltage V3 (Vmax) is applied to a pixel producing the maximum brightness. After the amplitude of the common signal CS is amplified in this way, the applied voltage for each pixel is shifted to an applied voltage range (second applied voltage range) VIR2 between a voltage V2 (VLmin) and the voltage V3 shown by arrows in FIG. 2. Further, in the first embodiment, the control signal output from the controller CNT to the image signal drive circuit DDR is also suitably changed, and converted so that an applied voltage for each pixel associated with display data falls within a voltage range between V2 and V1. In this case, when the brightness of display data for a pixel at a preset position is the maximum brightness, the applied voltage for the pixel electrode is the conventional pixel voltage (image signal) so that an applied voltage for the pixel is V3.

Thus, with the liquid crystal display device according to the first embodiment, an applied voltage for a pixel displaying an image corresponding to display data from an external input is converted to a drain voltage within a voltage range between V2 and V1. At the same time, a drain voltage corresponding to the maximum brightness is applied to a pixel for displaying a disturbing pattern (described in detail below), where the pixel voltage is V3.

In this case, although a large voltage is applied to each pixel in the liquid crystal display device according to the first embodiment, voltage ranges VIR1 and VIR2 coincide with each other. More specifically, the range over which the image signal drive circuit DDR outputs is the same in the wide view-angle and view-angle control operations.

The above-mentioned applied voltage control for the pixel provides a very small difference between the front brightness and the oblique brightness within the applied voltage range VIR1 in conventional wide view-angle operation, as clearly illustrated in FIG. 2. More specifically, the front brightness and oblique brightness rise according to the voltage (liquid crystal drive voltage) applied to the pixel, revealing almost the same characteristics. In this case, as the applied voltage approaches the voltage V1 denoting the maximum brightness (maximum front brightness B1 and maximum oblique brightness B2), the brightness characteristic lines BV1 and BV2 intersect with each other. When the applied voltage reaches V1, the maximum brightness B1 and B2 are reached respectively.

By contrast, when a voltage within a voltage range between V2 and V1 is applied to each pixel according to display data, even the front brightness falls within a range between brightness B4 and brightness B1, resulting in reduced contrast. However, the above-mentioned applied voltage control provides a very small difference between the front brightness and the oblique brightness.

On the other hand, when the voltage V3 larger than the voltage V1 for obtaining the maximum brightness is applied to each pixel, the front brightness becomes the brightness B1 (a black dot P3) which is almost the same as the brightness when the voltage V1 is applied (a white dot P1). However, the oblique brightness becomes brightness B3 (a black dot P4) which is very smaller than the brightness B2 when the voltage V1 is applied (a white dot P2). Therefore, even with a liquid crystal display device of the IPS type having excellent view angle characteristics, controlling the common voltage and the drain voltage to control an applied voltage for each pixel enables displaying a pattern that can be recognized only from an oblique direction and not from the front direction (such a pattern is referred to as disturbing pattern).

Figure 4:
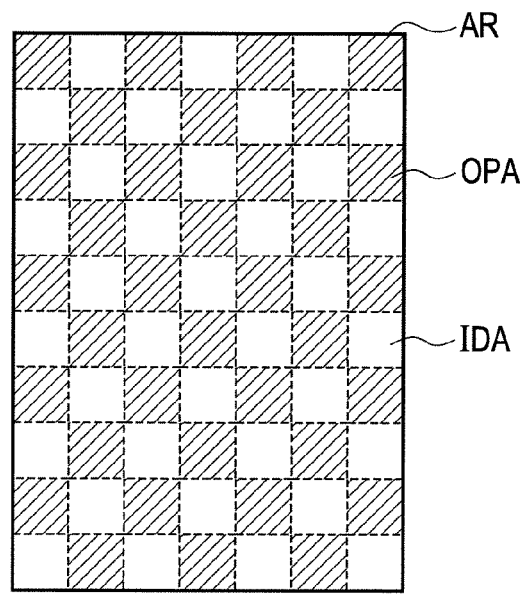
FIG. 4 illustrates a display operation in view-angle control operation with the liquid crystal display device according to the first embodiment of the present invention.

FIG. 4 illustrates a display operation in view-angle control operation with the liquid crystal display device according to the first embodiment of the present invention. Disturbing pattern display operation by the liquid crystal display device according to the first embodiment will be described below with reference to FIGS. 2 to 4. However, for the sake of simplification, disturbing pattern display operation will be described below based on a case where non-white text and image are displayed on a white background portion used for text input and display, and based on a case where a checkered pattern is displayed as a disturbing pattern.

With the liquid crystal display device according to the first embodiment, the drive voltage V3 is applied to each pixel to display the disturbing pattern by using the view-angle dependency of the brightness caused by applying the voltage V3. The voltage V3 is larger than the maximum brightness voltage V1 (in wide view-angle operation) in the applied voltage range VIR1 over which the brightness monotonically increases with increasing applied voltage. Therefore, as illustrated in FIG. 4, the display area AR of the liquid crystal display device panel is divided into two different types of areas, the voltage V1 is applied to a pixel producing the maximum brightness in a normal display area (second area) IDA, and the voltage V3 is applied to a pixel producing the maximum brightness in a disturbing pattern area (first area) OPA. In this case, the normal display area IDA and the disturbing pattern area OPA are alternately arranged in the vertical and horizontal directions. Division control for the normal display area IDA and the disturbing pattern area OPA can be achieved by, for example, storing conversion values for producing the maximum brightness so that the voltages V1 and V3 are obtained according to pixel positions in table data which is referenced by the controller CNT in view-angle control operation.

With the above-mentioned configuration, when each pixel in the normal display area IDA performs maximum brightness display, the voltage V1 is applied to each pixel, providing a very small difference between the front brightness and the oblique brightness. On the other hand, when each pixel in the disturbing pattern area OPA performs maximum brightness display, the voltage V3 is applied to each pixel, providing a very large difference between the front brightness and the oblique brightness. More specifically, as illustrated in FIG. 2, pixels to which voltages V1 and V3 are applied produce almost the same front brightness B1. On the other hand, pixels to which voltage V1 is applied produce the oblique brightness B1, and pixels to which voltage V3 is applied produce the oblique brightness B3. An observer in an oblique direction observes the checkered pattern such that the normal display area IDA with applied voltage V1 is bright and the disturbing pattern area OPA with applied voltage V3 is dark.

Figure 5:
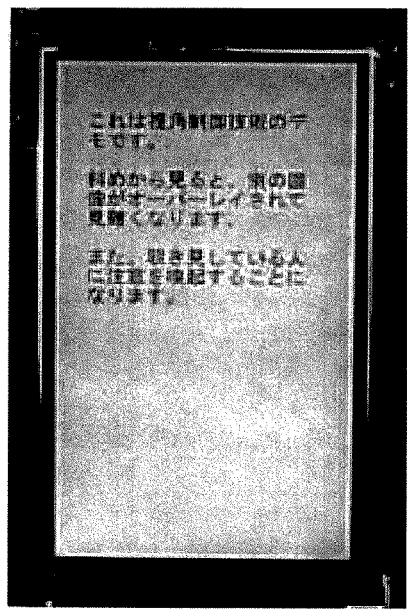
FIG. 5 is a photograph of the display surface viewed from the front direction in view-angle control operation with the liquid crystal display device according to the first embodiment of the present invention.
Figure 6:
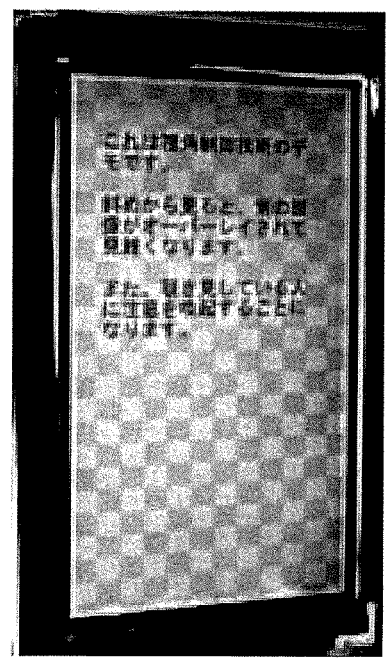
FIG. 6 is a photograph of the display surface viewed from the oblique direction in view-angle control operation with the liquid crystal display device according to the first embodiment of the present invention.

FIG. 5 is a photograph of the display surface viewed from the front direction in view-angle control operation with the liquid crystal display device according to the first embodiment of the present invention. FIG. 6 is a photograph of the display surface viewed from an oblique direction in view-angle control operation with the liquid crystal display device according to the first embodiment of the present invention. However, FIG. 6 is a photograph of the display surface viewed from an oblique direction 45 degrees from the normal line to the display surface of the liquid crystal display device panel.

FIG. 5 illustrates a case where text is displayed with an applied voltage for producing brightness lower than the maximum brightness B1, on a white background portion producing the maximum brightness B1 with applied voltages V1 and V3. Even in this case, it is clear that, when observed from the front direction, there is no large difference between the brightness in the normal display area IDA with applied voltage V1 and the brightness in the disturbing pattern area OPA with applied voltage V3.

By contrast, as illustrated in FIG. 6, when observed from an oblique direction, the normal display area IDA with applied voltage V1 is bright and the disturbing pattern area OPA with applied voltage V3 is dark, resulting in a checkered pattern which is a disturbing pattern.

As described above, with the liquid crystal display device according to the first embodiment, applied voltages satisfy a relation V2<V1<V3 where V2 denotes a liquid crystal drive voltage for producing the minimum brightness, V1 denotes a liquid crystal drive voltage for producing the maximum brightness, and V3 denotes a maximum voltage applied to each pixel. The display area is composed of the normal display area (first area) with applied voltage V1 as a liquid crystal drive voltage for producing the maximum brightness, and the disturbing pattern area (second area) with applied voltage V3. Therefore, only when observed from an oblique direction, patterns having different brightness can be displayed as disturbing patterns between the normal display area IDA and the disturbing pattern area OPA.

With the liquid crystal display device according to the first embodiment, directly varying the front and oblique contrast ratios only by the applied voltage for each pixel enables obtaining a special effect that image display can be performed without degrading the time resolution and spatial resolution.

Although, with the liquid crystal display device according to the first embodiment, only the liquid crystal drive voltage V3 is applied to a pixel producing the maximum brightness, the configuration is not limited thereto. For example, a liquid crystal drive voltage to be applied to a pixel producing brightness close to the maximum brightness may be converted to the voltage V3.

Second Embodiment

Figure 7:
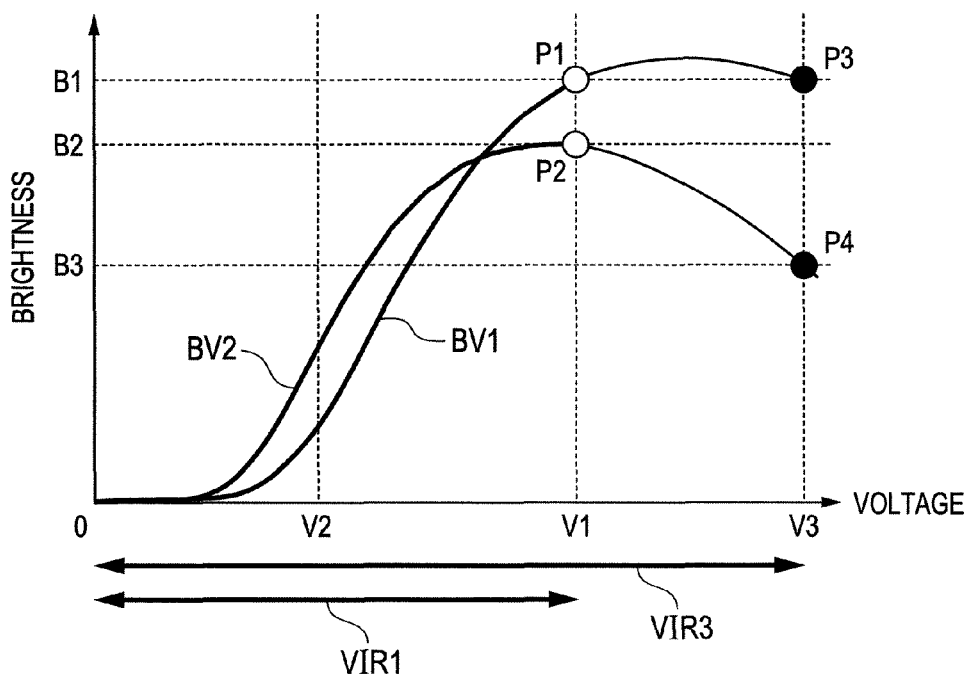
FIG. 7 is a graph illustrating a relation between an applied voltage for a pixel and brightness thereof with the liquid crystal display device according to a second embodiment of the present invention.

FIG. 7 is a graph illustrating a relation between an applied voltage for a pixel and brightness thereof with the liquid crystal display device according to a second embodiment of the present invention. With reference to FIG. 7, view-angle control operation will be described below which is performed when the wide view-angle voltage and view-angle control voltage are applied to each pixel in a liquid crystal display device according to a second embodiment. Like the first embodiment, drain voltage supply to a pixel producing the maximum brightness can be achieved with reference to the table data provided in the controller CNT.

With the liquid crystal display device according to the second embodiment, the output voltage of the common signal drive circuit CDR for supplying the common signal has a center voltage V0, an amplitude maximum voltage VH1 and an amplitude minimum voltage VL1. The liquid crystal display device according to the second embodiment makes greater the amplitude range of the drain voltage output from the image signal drive circuit DDR so that an applied voltage range VIR3 is set as a liquid crystal drive voltage range applied to each pixel. In this case, the common signal has a fixed amplitude range.

With the liquid crystal display device according to the second embodiment, when wide view-angle display is instructed as an external signal, the drain voltage corresponding to the liquid crystal drive voltage denoted by the applied voltage range VIR1 in FIG. 7 is supplied to the pixel electrode. During this operation, when the output voltage at the time of inverted drive of the common signal is VL1, for example, VL1 is output also as a drain voltage to a pixel producing the minimum brightness. Thus, the liquid crystal drive voltage applied between the common electrode and the pixel electrode is 0V when the minimum brightness illustrated in FIG. 7 is zero. On the other hand, when the output voltage of the common signal is VL1, a voltage corresponding to the liquid crystal drive voltage V1 is output as a drain voltage to a pixel producing the maximum brightness. Thus, the liquid crystal drive voltage V1 is applied between the common electrode and the pixel electrode. However, for halftone display between the minimum brightness 0 and the maximum brightness B1, a voltage corresponding to a preset liquid crystal drive voltage (0<halftone display voltage<V1) is supplied as a drain voltage to each pixel electrode.

By contrast, when view-angle control operation is specified, a drain voltage corresponding to the applied voltage range VIR1 is supplied to pixels other than a pixel producing the maximum brightness like wide view-angle display, thus achieving gray-scale display similar to that in wide view-angle display. On the other hand, a drain voltage involving the liquid crystal drive voltage V3 is supplied to a pixel with maximum brightness display specification. In this case, as is the case with the above-mentioned first embodiment, the liquid crystal drive voltage V3 is applied to each pixel only in the disturbing pattern area OPA and the voltage V1 is applied thereto in the normal display area IDA.

Also with the liquid crystal display device according to the second embodiment, applying voltages in this way enables providing a large difference between the front brightness and the oblique brightness, as illustrated by white dots P1 and P2 and black dots P3 and P4. Accordingly, the disturbing pattern can be displayed, thus obtaining a similar effect to that in the first embodiment.

With the liquid crystal display device according to the second embodiment, the same pixel voltage as the one in wide view-angle display can be applied to pixels other than a pixel producing the maximum brightness even in view-angle control operation. Thus, it becomes possible to exhibit a special effect that the disturbing pattern can be displayed without reducing the quality of display from the front direction.

Third Embodiment

Figure 8:
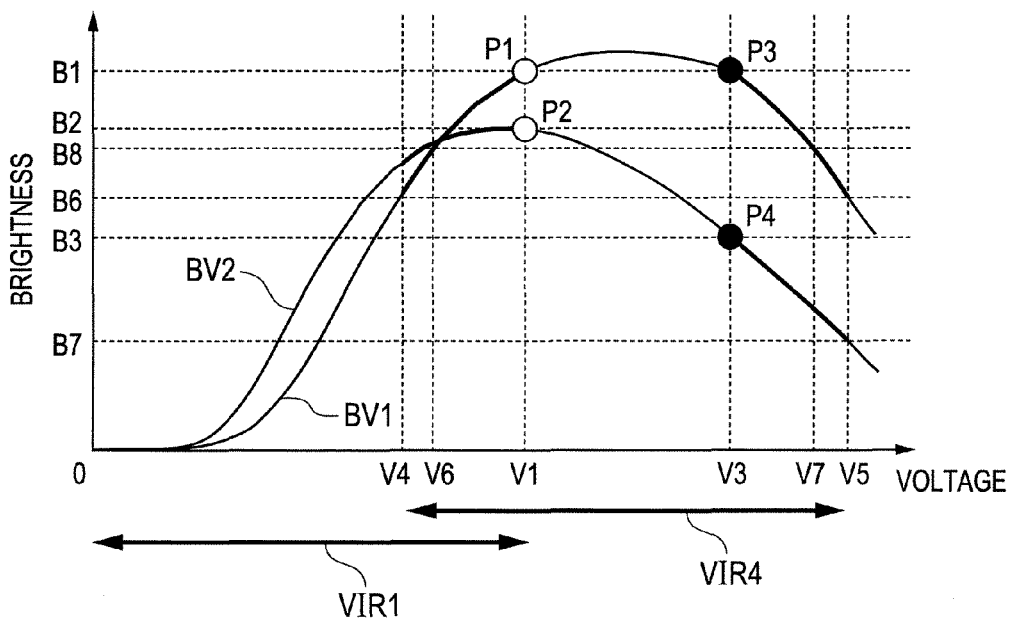
FIG. 8 is a graph illustrating a relation between an applied voltage for a pixel and brightness thereof with the liquid crystal display device according to a third embodiment of the present invention.

FIG. 8 is a graph illustrating a relation between an applied voltage for a pixel and brightness thereof with the liquid crystal display device according to a third embodiment of the present invention. With reference to FIG. 8, view-angle control operation will be described below which is performed when the wide view-angle voltage and view-angle control voltage are applied to each pixel in a liquid crystal display device according to the third embodiment.

The liquid crystal display device according to the third embodiment performs image display in halftone area by using an applied voltage equal to or higher than the liquid crystal drive voltage V3, and particularly copes with variation in the amplitude voltage of the common signal in the first embodiment. In view-angle control operation, a pixel voltage with applied voltage V1 or lower is selected in the normal display area IDA with reference to the front brightness. For pixels in the disturbing pattern area OPA, a liquid crystal drive voltage producing the same front brightness and involving applied voltage V3 or higher is selected. However, the liquid crystal display device according to the third embodiment is designed to supply a liquid crystal drive voltage producing the same front brightness in the normal display area IDA where liquid crystal drive voltage V1 or lower is applied to each pixel and in the disturbing pattern area OPA where the liquid crystal drive voltage V3 or higher is applied to each pixel. The above-mentioned configuration enables display with a small variation between the front brightness and the oblique brightness, as illustrated by bold lines in FIG. 8, in the normal display area IDA where liquid crystal drive voltage V4 or higher or V1 or lower is applied to each pixel. On the other hand, the configuration enables display with a large variation between the front brightness and the oblique brightness in the disturbing pattern area OPA where the liquid crystal drive voltage V3 or higher and V5 or lower is applied to each pixel.

More specifically, as illustrated in FIG. 8, in the case of pixels producing front brightness B8, a liquid crystal drive voltage V6 is applied to each pixel in the normal display area IDA. In this case, the pixel also produces the oblique brightness B8, achieving wide view-angle display. On the other hand, in the case of pixels in the disturbing pattern area OPA, a liquid crystal drive voltage V7 producing the front brightness B8 is applied to each pixel. This pixel produces the front brightness B8 and oblique brightness B7.

Thus, the liquid crystal display device according to the third embodiment enables halftone image display also in the disturbing pattern area OPA. With this configuration, even when a photograph or television image having few pixels producing the maximum brightness is displayed on a screen, there is a large difference between the front brightness and the oblique brightness for each pixel in the disturbing pattern area OPA, enabling disturbing pattern display.

Figure 9:
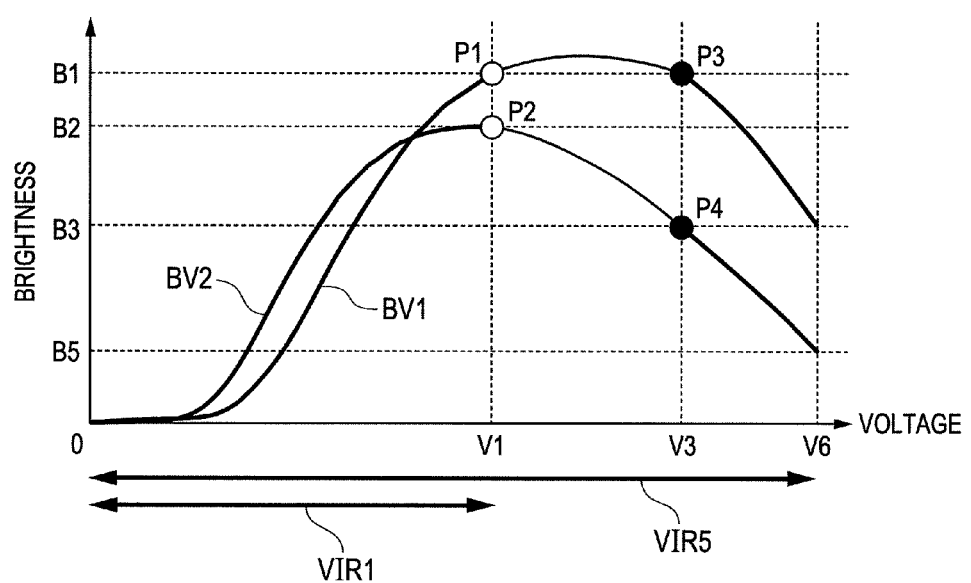
FIG. 9 is a graph illustrating a relation between an applied voltage for a pixel and brightness thereof in other liquid crystal display devices according to the third embodiment of the present invention.

The liquid crystal display device according to the third embodiment has specifically been described based on a case where the amplitude range of the common signal is varied. However, as is the case with the liquid crystal display device according to the second embodiment, the liquid crystal drive voltage range applied to each pixel can be enlarged by enlarging the amplitude range of the drain voltage output from the image signal drive circuit DDR, i.e., by enlarging the voltage range to be supplied to the pixel electrode. For example, as illustrated in FIG. 9, the liquid crystal drive voltage range applied to each pixel can be enlarged by enlarging the amplitude range of the voltage output from the image signal drive circuit DDR. Therefore, since both the liquid crystal drive voltage range in the normal display area IDA (0V to V1) and the liquid crystal drive voltage range in the disturbing pattern area OPA (V3 to V4) can be enlarged together, the disturbing pattern can be displayed from an oblique direction while restraining reduction in contrast from the front direction. Also in this case, since the applied voltage ranges from V3 to V6 in the disturbing pattern area OPA, the disturbing pattern viewed from an oblique direction can also be displayed on a gray-scale basis.

Although the first to third embodiments have specifically been described based on a liquid crystal display device of the common inverted drive type, these embodiments are also applicable to a liquid crystal display device of other drive types.

Applying the present invention to a liquid crystal display device of the VA type having a larger view-angle dependency than the IPS type enables obtaining a more remarkable effect than applying the present invention to a liquid crystal display device of the IPS type.

Although the invention devised by the present inventor has specifically been described based on the above-mentioned embodiments, the present invention is not limited to thereto but can be modified in diverse ways without departing from the spirit and scope thereof.

What is claimed is:

1. A liquid crystal display device comprising:
   first and second substrates disposed facing each other via a liquid crystal layer, each substrate having a plurality of pixels arranged thereon in matrix form;
   a first electrode formed for each pixel on the first substrate side;
   a second electrode formed for each pixel on the first or second substrate side; and
   the liquid crystal layer being configured to be driven by a liquid crystal drive voltage applied between the first and second electrodes;
   wherein an inequation of $VLmin \leq VLmax < Vmax$ is satisfied, where VLmin is a liquid crystal drive voltage applied to the pixel to produce minimum brightness, VLmax is a liquid crystal drive voltage applied to the pixel to produce maximum brightness, and Vmax is a maximum liquid crystal drive voltage applied to the pixel, and
   wherein first and second areas are formed together in a predetermined display area which is divided into the first and second areas, the first area including pixels to which the applied liquid crystal drive voltage Vmax is applied, and the second area including pixels to which only a liquid crystal drive voltage between VLmin and VLmax ($VLmin \leq VLmax$) is applied.

2. The liquid crystal display device according to claim 1, wherein the liquid crystal drive voltage Vmax is applied to a pixel producing the maximum brightness.

3. The liquid crystal display device according to claim 2, further comprising:
   a display selection unit configured to select or deselect the liquid crystal drive voltage Vmax.

4. The liquid crystal display device according to claim 3, further comprising:
   a common signal drive circuit configured to supply a common AC signal as a reference for the liquid crystal drive voltage to the second electrode; and
   an image signal drive circuit configured to supply to the first electrode an image signal synchronizing with the common signal and corresponding to brightness of each pixel,
   wherein, based on an output of the display selection unit, the common signal drive circuit varies the amplitude range of the common signal and the image signal drive circuit varies the liquid crystal drive voltage VLmin.

5. The liquid crystal display device according to claim 3, further comprising:
   a common signal drive circuit configured to supply a common AC signal as a reference for the liquid crystal drive voltage to the second electrode; and
   an image signal drive circuit configured to supply to the first electrode an image signal synchronizing with the common signal and corresponding to brightness of each pixel,
   wherein the image signal drive circuit varies the maximum amplitude range of the image signal based on an output of the display selection unit to change the liquid crystal drive voltage from VLmax to Vmax.

6. The liquid crystal display device according to claim 1, further comprising:
   a display selection unit configured to select or deselect the liquid crystal drive voltage Vmax.

7. The liquid crystal display device according to claim 6, further comprising:
   a common signal drive circuit configured to supply a common AC signal as a reference for the liquid crystal drive voltage to the second electrode; and
   an image signal drive circuit configured to supply to the first electrode an image signal synchronizing with the common signal and corresponding to brightness of each pixel,
   wherein, based on an output of the display selection unit, the common signal drive circuit varies the amplitude range of the common signal and the image signal drive circuit varies the liquid crystal drive voltage VLmin.

8. The liquid crystal display device according to claim 6, further comprising:
   a common signal drive circuit configured to supply a common AC signal as a reference for the liquid crystal drive voltage to the second electrode; and
   an image signal drive circuit configured to supply to the first electrode an image signal synchronizing with the common signal and corresponding to brightness of each pixel,
   wherein the image signal drive circuit varies the maximum amplitude range of the image signal based on an output of the display selection unit to change the liquid crystal drive voltage from VLmax to Vmax.

9. The liquid crystal display device according to claim 1, further comprising:
   a display selection unit configured to select or deselect the liquid crystal drive voltage Vmax.

10. The liquid crystal display device according to claim 9, further comprising:
    a common signal drive circuit configured to supply a common AC signal as a reference for the liquid crystal drive voltage to the second electrode; and
    an image signal drive circuit configured to supply to the first electrode an image signal synchronizing with the common signal and corresponding to brightness of each pixel,
    wherein, based on an output of the display selection unit, the common signal drive circuit varies the amplitude range of the common signal and the image signal drive circuit varies the liquid crystal drive voltage VLmin.

11. The liquid crystal display device according to claim 9, further comprising:
    a common signal drive circuit configured to supply a common AC signal as a reference for the liquid crystal drive voltage to the second electrode; and
    an image signal drive circuit configured to supply to the first electrode an image signal synchronizing with the common signal and corresponding to brightness of each pixel,
    wherein the image signal drive circuit varies the maximum amplitude range of the image signal based on an output of the display selection unit to change the liquid crystal drive voltage from VLmax to Vmax.

* * * * *